United States Patent
McRaney et al.

(10) Patent No.: US 10,780,469 B2
(45) Date of Patent: Sep. 22, 2020

(54) SYSTEM FOR LASER TREATING A PIPE SURFACE

(71) Applicants: Brian McRaney, Bassfield, MS (US); Gregory McRaney, Bassfield, MS (US)

(72) Inventors: Brian McRaney, Bassfield, MS (US); Gregory McRaney, Bassfield, MS (US)

(*) Notice: Subject to any disclaimer, the term of this patent is extended or adjusted under 35 U.S.C. 154(b) by 132 days.

(21) Appl. No.: 16/047,119

(22) Filed: Jul. 27, 2018

(65) Prior Publication Data

US 2019/0030578 A1    Jan. 31, 2019

Related U.S. Application Data

(60) Provisional application No. 62/539,434, filed on Jul. 31, 2017.

(51) Int. Cl.
    *B08B 9/023*     (2006.01)
    *B08B 7/00*     (2006.01)
    *B23K 26/08*     (2014.01)

(52) U.S. Cl.
    CPC ............ *B08B 9/023* (2013.01); *B08B 7/0042* (2013.01); *B23K 26/0823* (2013.01); *B23K 26/0869* (2013.01)

(58) Field of Classification Search
CPC combination set(s) only.
See application file for complete search history.

(56) References Cited

U.S. PATENT DOCUMENTS

| | | | |
|---|---|---|---|
| 2,705,629 A | 4/1955 | Miller | |
| 2,823,398 A | 2/1958 | Curran | |
| 2,888,694 A * | 6/1959 | Betzel, Sr. | B08B 9/023 15/88 |
| 5,256,848 A | 10/1993 | Cartry et al. | |
| 5,520,734 A * | 5/1996 | Taylor | B05B 13/0214 118/307 |
| 5,615,696 A * | 4/1997 | Lawler | B08B 3/024 134/104.2 |
| 6,797,918 B1 | 9/2004 | Higgins | |
| 2007/0181541 A1 * | 8/2007 | Akaba | B23K 26/067 219/121.8 |
| 2009/0272722 A1 * | 11/2009 | Sbetti | B08B 7/0042 219/121.6 |
| 2016/0339487 A1 | 11/2016 | Higgins | |

FOREIGN PATENT DOCUMENTS

EP     2537624 A2     12/2012

OTHER PUBLICATIONS

ISRWO of corresponding PCT/US2018/044004 dated Dec. 14, 2018.

* cited by examiner

*Primary Examiner* — Erin F Bergner
(74) *Attorney, Agent, or Firm* — Vorys, Sater, Seymour and Pease LLP

(57) ABSTRACT

A laser cleaning system for laser treating a pipe surface includes a frame mountable to an outer circumference of a cylindrical pipe, a plurality of circumferential guide supports mounted to the frame and engageable with the outer circumference of the pipe, and a laser mounted to the frame to generate a laser beam directed toward an exterior surface of the pipe. The frame is movable about the outer circumference of the pipe on the plurality of circumferential guide supports to scan the laser beam circumferentially across the exterior surface.

18 Claims, 2 Drawing Sheets

SYSTEM FOR LASER TREATING A PIPE SURFACE

BACKGROUND

Laser cleaning is used for a variety of applications, such as removing paint from delicate surfaces, stripping insulation from conductors, engraving metal surfaces, and removing vulcanizing residue from tire molds. In contrast to conventional substrate cleaning systems that typically involve the use of chemicals and/or abrasives, laser cleaning has a much lower impact on the environment and a significantly decreased chance of wear on the substrate being cleaned.

Nearly all industrial laser cleaning applications are based on pulsed laser radiation, but it is possible to ablate material with a continuous wave laser beam if the laser intensity is sufficiently high. With pulsed laser cleaning, an extremely brief laser pulse (typically in the µs-ms range) is aimed at the surface of the substrate to be cleaned (removed). The energy applied to the top layer of the surface cannot dissipate quickly enough and, therefore, a portion of the material vaporizes while the remainder may be suctioned away as particle dust collected in a filtration system. This process is repeated until the desired ablation depth has been reached.

The adaptation of laser cleaning to particular surface types may present challenges. For example, cylindrical pipes must be cleaned prior to painting or undergoing other external treatments. Due to the cylindrical nature of the external pipe surface, conventional rigs for mounting laser cleaning devices are not readily adaptable to the particular curvature of a pipe surface. Moreover, laser cleaning systems often automatically scan the pulsed laser beam in a one-dimensional linear or two-dimensional rectangular pattern. When applied to a cylindrical surface, however, such a system would require constant readjustment.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to metal subsurface preparation and, more particularly, to a system for laser treating a pipe surface for the removal substances therefrom.

The embodiments disclosed herein describe a laser cleaning system for treating a pipe surface. In some embodiments, the laser cleaning system may include a frame extendable about an outer circumference of a cylindrical pipe, and a plurality of circumferential guide supports mounted to the frame and engageable with the outer circumference of the pipe. A laser may be mounted to the frame and configured to generate a laser beam. The laser may be movable about the outer circumference of the pipe on the plurality of circumferential guide supports to scan the laser beam circumferentially across an exterior surface of the pipe. In some embodiments, at least one rail may be coupled to the frame, and the laser may be movably coupled to the at least one frame. In operation, the laser may be moved axially on the at least one rail in an axial direction relative to the pipe and thereby capable of scanning the laser beam axially across the exterior surface of the pipe. In at least one embodiment, a motor may be operatively coupled to the laser and/or the circumferential guide supports to move the laser axially and circumferentially relative to the exterior surface.

The pipe cleaning industry is evolving into a more automated, higher production, quality controlled industry. The presently described embodiments offer several advantages over conventional pipe cleaning systems. For example, while conventional pipe cleaning systems employ sand blasting and/or harmful chemicals, the laser cleaning systems described herein have little or no adverse impact on the environment. Moreover, the automated features of the laser cleaning system described herein can replace time-consuming manual labor, thus dramatically reducing costs for cleaning pipelines. Replacing manual labor may also reduce the occurrence of employee injury, such as through the manual labor of lifting 100 lb. sand bags and reducing heat exhaustion from conventional sandblasting hoods of conventional systems.

Figure 1:
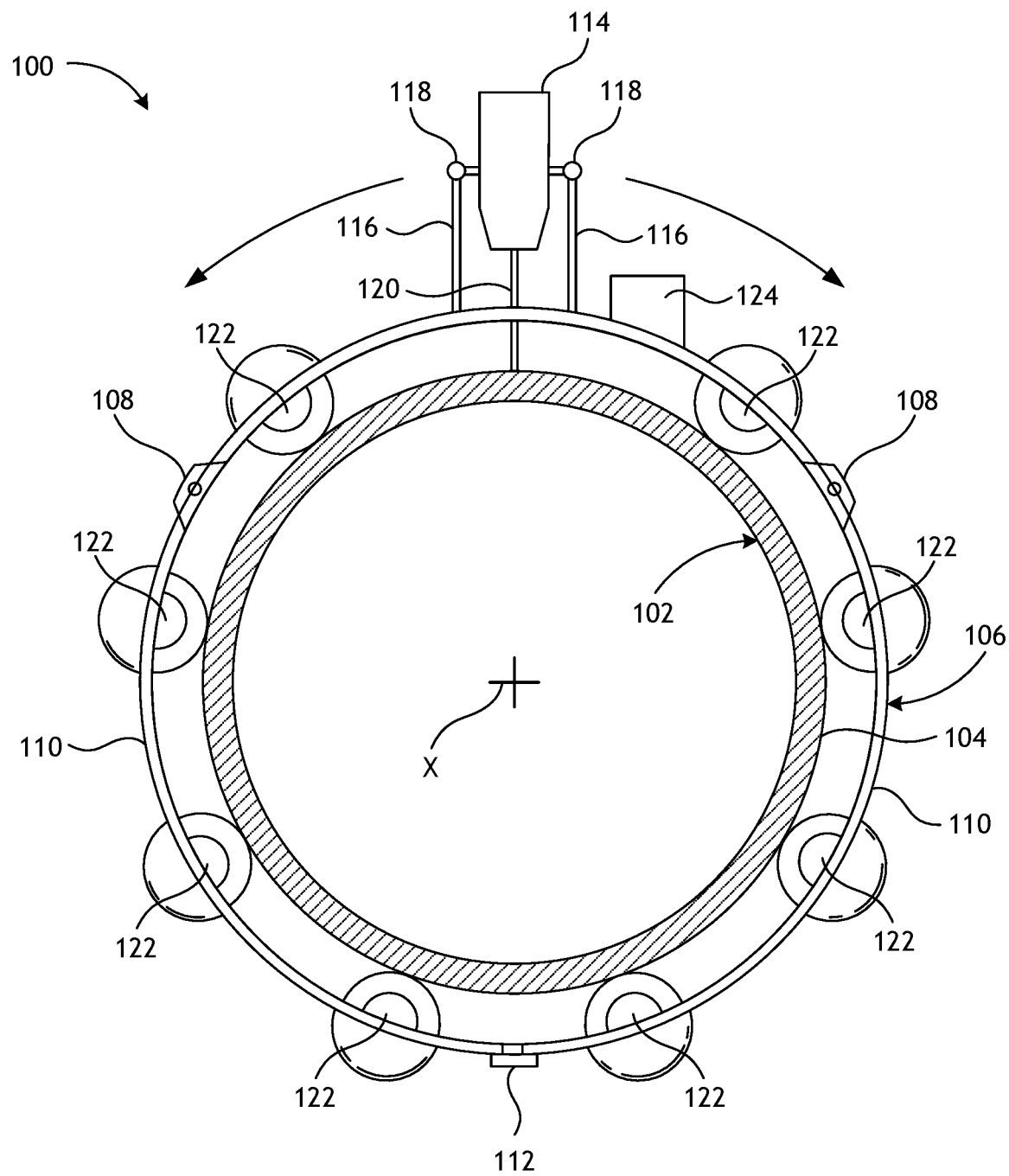
FIG. 1 is an end view of an example laser cleaning system, according to one or more embodiments of the present disclosure.

FIG. 1 is an end view of an example laser cleaning system 100, according to one or more embodiments of the present disclosure. The laser cleaning system 100 (hereafter "the system 100") may be designed and otherwise configured to be mounted to a pipe 102 and activated to remove one or more substances from an exterior surface 104 of the pipe 102. Example substances that may be present on the exterior surface 104 of the pipe 102 and removable using the system 100 include, but are not limited to, rust, corrosion, paint, oils, coatings (e.g., polyurethane), organic matter, debris, or any combination thereof.

As used herein, the term "pipe" refers to any conduit in which a fluid (i.e., a gas, a liquid, a slurry, any combination thereof, etc.) can be moved (conveyed) and may alternately be referred to as a line pipe, piping, pipeline, or a fluid conduit. In some embodiments, the pipe 102 may comprise part of a pipeline or piping used in the oil and gas industry to convey crude oil, a refinery product, an intermediate product, a chemical, or a gas. In such embodiments, the pipe 102 may form part of any onshore or offshore flow system, such as mainline systems, long distance pipelines, risers, or flow lines used to transport untreated fluid between a wellhead and a processing facility, and flow lines used to transport hydrocarbon products, intermediate products, or byproducts as well as pipeline systems used to transport processed crude, products from refinery systems including gasoline, diesel, jet fuel, volatile liquids etc. In other embodiments, however, the pipe 102 may form part of a pipeline or piping system used in other industries, such as potable water pipelines, sewer water pipelines, natural gas pipelines, without departing from the scope of the disclosure.

It should be understood that the pipe 102 is shown for exemplary purposes only, and that the system 100 may be used for laser cleaning any suitable type of pipe, vessel, receptacle, conduit or the like. As illustrated, the pipe 102 may comprise a generally cylindrical structure having a circular cross section. The principles of the present disclosure, however, may be equally applicable to pipes having other cross-sectional shapes such as, but not limited to, polygonal (e.g., rectangular, pentagonal, hexagonal, etc.), oval, ovoid, or any combination thereof.

As illustrated, the system 100 may include a frame 106 and a laser 114 mounted to the frame 106 to treat the exterior surface 104 of the pipe 102. The frame 106 may be generally circular and sized to extend about the circumference of the pipe 102. In some embodiments, as illustrated, the frame 106 may be sized to extend about the entire circumference of the pipe 102. In other embodiments, however, the frame 106 may extend more than 180° but less than 360° about the circumference of the pipe 102, without departing from the scope of the disclosure.

The frame 106 may be manufactured in a variety of different sizes, thereby allowing the system 100 to be used with a wide variety of different pipes and pipe sizes. In some embodiments, the size (diameter) of the frame 106 may be adjustable to enable the frame 106 to extend about varying sizes of the pipe 102. The frame 106 may be made of a variety of rigid materials including, but not limited to, aluminum, stainless steel, a lightweight metal alloy, a composite material, a polymer, or any combination thereof.

In some embodiments, the frame 106 may include one or more hinges 108 (two shown) configured to allow the frame 106 to pivot between open and closed positions. In the open position, arcuate portions 110 of the frame 106 may pivot radially outward to allow the frame 106 to be extended about all or a portion of the pipe 102. Once the frame 106 is mounted about the pipe 102, the arcuate portions 110 may be pivoted back toward the closed position. In some embodiments, the frame 106 may further include a locking mechanism 112 configured to removably couple the arcuate portions 110 of the frame 106 in the closed position, thus preventing the frame 106 from disengaging from the pipe 102. In at least one embodiment, the locking mechanism 112 may be adjustable to account for diameter changes in the pipe 102, and thus ensuring that the frame 106 may be properly mounted to the pipe 102 for operation.

The laser 114 may be mounted to the frame 106 such that it is radially offset from the exterior surface 104 a short distance. The radial offset between the laser 114 and the exterior surface 104 may range between about two inches and about twelve inches, depending on the type of laser 114 used. It will be appreciated, however, that the radial offset may be less than two inches or more than twelve inches, without departing from the scope of the disclosure. In the illustrated embodiment, the frame 106 may include one or more struts 116 (two shown in FIG. 1) that are coupled to and extend radially outward from the frame 106. The frame 106 may also include one or more rails 118 coupled to the end(s) of the struts 116 to receive and support the laser 114 radially above the exterior surface 104. The radial offset between the laser 114 and the exterior surface 104 may be adjusted by changing the configuration of the rails 118 and/or the struts 116. In at least one embodiment, for example, the rails 118 may be movably coupled to the struts 116, and thereby capable of adjusting the radial offset. While FIG. 1 depicts the laser 114 being supported by two rails 118, the laser 114 may alternatively be supported by a single rail 118, without departing from the scope of the disclosure.

The rails 118 may extend longitudinally and otherwise substantially parallel to the longitudinal axis X of the pipe 102. In some embodiments, the laser 114 may be fixedly attached to the rails 118 for operation. In other embodiments, however, the laser 114 may be slidably mounted to the rails 118, thus providing the laser 114 with the ability to translate axially along the longitudinal axis X during operation. In at least one embodiment, however, the rails 118 may be omitted and the laser 114 may alternatively be secured directly to the strut(s) 116 for operation.

The laser 114 may comprise any suitable type of laser capable of removing substances present on the exterior surface 104 of the pipe 102. In some embodiments, for example, the laser 114 may comprise a pulsed laser device, such as a $CO_2$ or an Nd:YAG (neodymium-doped yttrium aluminum garnet; $Nd:Y_3Al_5O_{12}$) pulsed laser. In such embodiments, the laser 114 may comprise the Lasersystem CL300, manufactured by Adapt Laser Systems, LLC of Missouri, USA. Other example laser systems include the CL500, CL600, or CL1000 also manufactured by Adapt Laser Systems, LLC. In other embodiments, however, the laser 114 may comprise a continuous wave laser capable of generating laser intensity high enough to remove the substances (e.g., rust, corrosion, etc.) from the pipe 102.

The laser 114 may be configured to generate and emit a laser beam 120 that may be directed toward the exterior surface 104. In some embodiments, the laser beam 120 may be used to remove rust and corrosion that may be present on the exterior surface 104, such as at the location of a welded interface. The energy of the laser beam 120 may be selectively absorbed by substances present on the exterior surface 104 to clean or otherwise prepare the exterior surface 104 without damaging the underlying substrate of the pipe 102. The parameters of the laser 114 may be selected such that the energy of the laser beam 120 is powerful enough to destroy, vaporize, and otherwise directly convert the substance(s) present on the exterior surface 104 into gases and/or dust, a process known as "ablation." This physical process involves the laser beam 120 applying intense heat for a short period of time (e.g., less than a millionth of a second) to drastically increase the temperature of the substance(s). This causes solid and liquid substances to turn substantially instantaneously into a gas and/or fine dust.

In some embodiments, as illustrated, a plurality of circumferential guide supports 122 may be mounted to the frame 106. As illustrated, the circumferential guide supports 122 may be equidistantly spaced from each other, but may alternatively be non-equidistantly spaced, without departing from the scope of the disclosure. Moreover, while eight circumferential guide supports 122 are depicted in FIG. 1, more or less than eight may be employed. The circumferential guide supports 122 may engage the outer circumference of the pipe 102 to help center the system 100 on the pipe 102 and thereby arrange the laser 114 at a predetermined distance away from the exterior surface 104.

In some embodiments, the circumferential guide supports 122 may also help facilitate angular (rotational) movement of the system 100 about the circumference of the pipe 102 in either angular direction (clockwise or counter-clockwise). This may prove advantageous in allowing the laser 114 to scan circumferentially about the exterior surface 104. In such embodiments, one or more of the circumferential guide supports 122 may comprise rotatable (movable) structures capable of allowing the system 100 to angularly traverse the outer circumference of the pipe 102. Suitable rotatable structures include, but are not limited to, wheels, continuous track assemblies (i.e., tank tread), rotatable gears, rotatable pulleys and/or belts, or any combination thereof.

In some embodiments, the system 100 may be manually rotated about the pipe 102 as rotationally supported by the circumferential guide supports 122. In such embodiments, an operator may grasp onto the frame 106 (or another rigid part of the system 100) and manually adjust (move) the angular location of the system 100 during operation. In other embodiments, however, one or more of the circumferential guide supports 122 may be mechanically driven in rotation to rotate the system 100 about the pipe 102. In such embodiments, the system 100 may further include a motor 124 operatively coupled to one or more of the circumferential guide supports 122 and operable to drive the corresponding circumferential guide supports 122 to rotationally adjust the angular location of the laser 114 in a controlled and automated manner.

Any suitable type of gearing, linkages, transmission, etc. may be provided for operatively coupling the circumferential guide supports 122 to the motor 124 for rotational movement. In some embodiments, for example, the motor 124 may be configured to power a drive shaft that mates with a corresponding driven gear, and the driven gear may be configured to drive a continuous chain (or belt) operatively coupled to one or more of the circumferential guide supports 122. In such embodiments, driving the continuous chain (or belt) in either direction correspondingly moves and drives the circumferential guide supports 122 operatively coupled thereto, which facilitates angular movement of the system 100 about the circumference of the pipe 102. As will be appreciated, this allows the laser 114 to scan the exterior surface 104 at a controlled rate.

The motor 124 may comprise any type of motor capable of generating a driving force including, but not limited to, an electrical motor, an electromechanical motor, an air-driven motor, a hydraulic motor, or any combination thereof. Annular rigs for motorized and controlled rotation about pipe surfaces are known, and it should be understood that any such suitable motorized system may be used for the motorized and controlled movement of the laser 114 about the pipe 102. One example of such a system is shown in U.S. Pat. No. 5,520,734, which is hereby incorporated by reference in its entirety.

Figure 2:
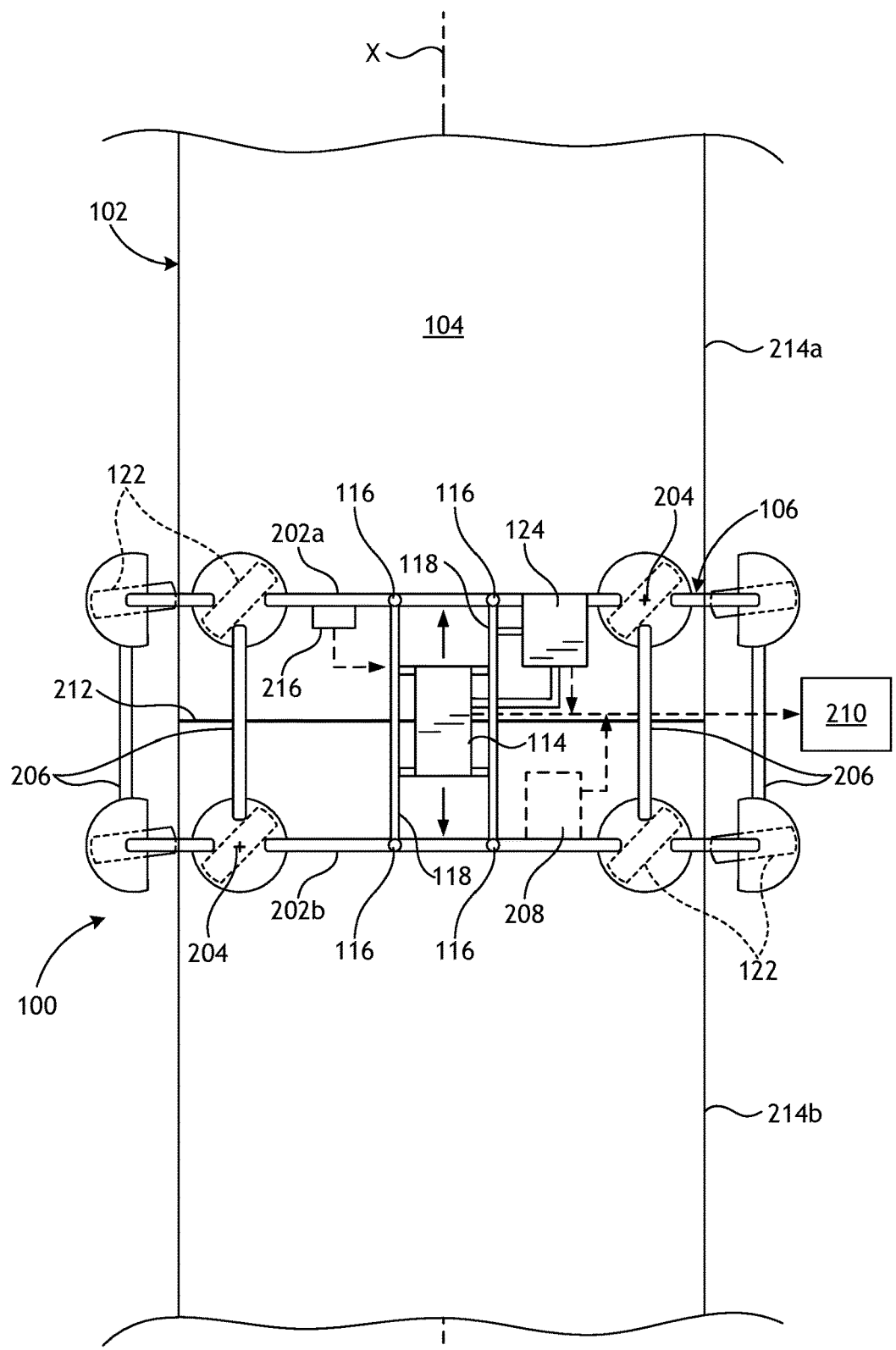
FIG. 2 is a top perspective view of the laser cleaning system of FIG. 1, according to one or more embodiments.

FIG. 2 is a top perspective view of the system 100 as mounted to the pipe 102, according to one or more embodiments. In the illustrated embodiment, the frame 106 includes a first annular support 202*a* and a second annular support 202*b* axially offset from the first annular support 202*a*. The first and second annular supports 202*a,b* may comprise opposed arcuate members that extend about all or a portion of the circumference of the pipe 102. Moreover, each annular support 202*a,b* may have one or more circumferential guide supports 122 rotatably coupled thereto.

In some embodiments, one or more of the circumferential guide supports 122 may be pivotable about a respective support axis 204 (two shown), similar to how a caster wheel is able to rotate about a central axis. In such embodiments, the angular orientation of the corresponding circumferential guide supports 122 may be altered, such as through the use of corresponding servos or the like operatively coupled to the circumferential guide supports 122. Driving such circumferential guide supports 122 after altering the angular orientation may allow the laser 114 to simultaneously translate both angularly and axially relative to the exterior surface 104. Accordingly, if desired, the system 100 may be moved in a helical pattern. Having the circumferential guide supports 122 pivotable about the support axis 204 (two shown) may prove advantageous in allowing the system 100 to clean large axial and circumferential sections of the pipe 102 simultaneously without requiring the system 100 to be disengaged from the pipe 102 at one location and subsequently reengaged at another location.

In some embodiments, one or more cross members 206 may extend axially between the first and second annular supports 202*a,b*. In at least one embodiment, as illustrated, one or more of the cross members 206 may extend between axially adjacent circumferential guide supports 122 on the opposed annular supports 202*a,b*. The cross members 206 may prove advantageous in operatively coupling the first and second annular supports 202*a,b* and thereby making the system 100 more rigid for operation.

In the illustrated embodiment, the motor 124 is depicted as being operatively coupled to the first annular support 202*a*. Accordingly, the motor 124 may be operable to drive one or more of the circumferential guide supports 122 rotatably coupled to the first annular support 202*a* and thereby circumferentially adjust the angular location of the laser 114. In some embodiments, however, the system 100 may incorporate suitable gearing, linkages, transmission (e.g. a drive shaft), etc. to also operatively couple the motor 124 to one or more of the circumferential guide supports 122 rotatably coupled to the second annular support 202*b*. In such embodiments, the motor 124 may be operable to drive circumferential guide supports 122 rotatably coupled to each of the first and second annular supports 202*a,b*. Alternatively, the system 100 may further include a second motor 208 (shown in dashed lines) operatively coupled to the second annular support 202*b*. The second motor 208 may be operable to drive one or more of the circumferential guide supports 122 rotatably coupled to the second annular support 202*b*. In some embodiments, the first and second motors 124, 208 may operate in tandem, but may alternatively work independently to move the system 100 circumferentially and/or axially.

In the illustrated embodiment, the laser 114 is mounted to the frame 106 by interposing the rails 118, and the rails 118 may be coupled to the struts 116 (four shown) extending radially outward from the first and second annular supports 202*a,b*. In other embodiments, however, the struts 116 may be omitted from the system 100 and the rails 118 may be directly coupled to the first and second annular supports 202*a,b*. Moreover, it will be appreciated that the laser 114 may alternatively be coupled to only one rail 118, without departing from the scope of the disclosure. In some embodiments, as mentioned above, the laser 114 may be slidably mounted to the rails 118, thus enabling the laser 114 to translate axially between the first and second annular supports 202*a,b* and otherwise along the longitudinal axis X of the pipe 102. This may prove advantageous in allowing the system 100 to clean the exterior surface 104 of the pipe 102 along a larger axial window.

In some embodiments, the laser 114 may be operatively coupled to the motor 124, and the motor 124 may be operable to move the laser 114 axially relative to the pipe 102 and along the rails 118. In such embodiments, the motor 124 may include any type of actuation device capable of manipulating the axial position of the laser 114. In one embodiment, for example, the motor 124 may include an electromechanical actuator, such as a solenoid or a servo, operatively coupled to the laser 114 and configured to facilitate axial movement thereof. By selective sliding movement of the laser 114 on the rails 118, the laser 114 may be axially adjustable with respect to the pipe 102 for scanning the laser beam 120 (FIG. 1) axially across the exterior surface 104. Accordingly, the movement of the laser 114 with respect to the exterior surface 104 of the pipe 102, both in the axial direction (via the rails 118) and in the circumferential or radial direction (via circumferential guide supports 122) may be driven under the control of the motor 124.

Alternatively, or in addition thereto, the laser 114 may be operatively coupled to the second motor 208, and the second motor 208 may likewise be operable to move the laser 114 axially relative to the pipe 102. In such embodiments, both motors 124, 208 may be cooperatively operable to scan the laser beam 120 axially across the exterior surface 104. In at least one embodiment, for instance, the first motor 124 may be configured to move the laser 114 in a first axial direction, and the second motor 208 may be configured to move the laser 114 in a second axial direction opposite the first direction.

In some embodiments, the laser 114 and/or the motor 124 may be communicably coupled to a control module 210 configured control and operate the system 100. In embodiments that include the second motor 208, the control module 210 may also be communicably coupled to the second motor 208. The control module 210 may be in communication with the laser 114 and/or the motor(s) 124, 208 via any known wired or wireless means. Suitable wireless protocols include, but are not limited to, radio frequency (RF) transmission, Wi-Fi, Bluetooth®, ZigBee®, near field communication (NFC), infrared, or any combination thereof.

The control module 210 may include a user interface that enables a user to operate the system 100. The user interface may include, for example, a dedicated handheld device, a smartphone, a tablet, or another type of computing device. The user may be able to operate the system 100 on site or remotely via the user interface. Alternatively, or in addition thereto, the system 100 may be operated based on a computer program stored on a non-transitory computer readable medium (e.g., a memory included in the control module 210. In such embodiments, the computer program may include instructions that, when executed by a processor (e.g., a microprocessor), cause the system 100 to operate as generally described herein. For example, stored computer programs may include instructions that operate the motor(s) 124, 208 and thereby move the laser 114 both circumferentially and axially. Stored computer programs may also include instructions that operate the laser 114 as needed to remove substances from the exterior surface 104 of the pipe 102.

In example operation, the system 100 may be mounted to the pipe 102 at a location where the exterior surface 104 requires laser cleaning. In at least one embodiment, for example, the system 100 may be mounted to the pipe 102 at or near the location of a field joint 212 that may comprise, for example, a girth weld that couples a first pipe section 214a to a second pipe section 214b. Accordingly, in such embodiments, the pipe 102 may form part of a pipeline. The field joint 212, however, may be susceptible to corrosion, which could limit the useful life of the pipe 102. Accordingly, the system 100 may be used to remove rust and/or corrosion from the exterior surface 104 of the pipe 102 at or near the field joint 212 in preparation for applying a coating (e.g., a paint or the like) to the exterior surface 104 to seal the field joint 212.

In some embodiments, the system 100 may further include one or more sensors 216 configured to detect the field joint 212. The sensor 216 may comprise, for example, a sensor capable of detecting welded interfaces. Alternatively, the sensor 216 may comprise a sensor configured to detect a substance to be removed from the exterior 104 of the pipe 102, such as corrosion or rust, which could be indicative of the field joint 212. The sensor 216 may be communicably coupled to the control module 210 via the wired or wireless means mentioned herein. In such embodiments, the system 100 may be automatically moved along the pipe 102 on the circumferential guide supports 122 until positively detecting or otherwise identifying the location of the field joint 212 or a substance to be removed, at which point the system 100 may stop axial movement and prepare itself for laser cleaning operation. Accordingly, the system 100 may be entirely automated and capable of movement along the pipe 102 without the intervention of human personnel.

Once the system 100 is properly mounted to the pipe 102 and positioned at a desired location for laser cleaning, the system 100 may be manually or automatically operated via the control module 210. The laser 114 may be activated to generate the laser beam 120 (FIG. 1), and the laser beam 120 may proceed to ablate the exterior surface 104 of the pipe 102. The motor 124 (and/or the second motor 208) may be actuated to move the laser 114 circumferentially and/or axially relative to the exterior surface 104 of the pipe 102. More specifically, the motor 124 (and/or the second motor 208) may be actuated to drive one or more of the circumferential guide supports 122, which moves the laser 114 about the circumference of the pipe while simultaneously scanning the laser beam 120.

The motor 124 (and/or the second motor 208) may also be used to move the laser 114 axially to allow the laser beam 120 to impinge upon the exterior surface 114 across the field joint 212 and on opposing axial sides thereof. In at least one embodiment, for example, the laser 114 may be able to translate axially on the rail(s) 118 up to one foot on either side of the field joint 208. In other embodiments, however, the system 100 may be designed such that the laser 114 moves more or less than one foot on either side of the field joint 208, without departing from the scope of the disclosure.

Once the area of the pipe 102 is properly cleaned, the system 100 may be removed or otherwise moved axially along the pipe 102 to a new location that requires laser cleaning. The cleaned section of the pipe 102 may then be coated with a protective coating, such as polyurethane or an epoxy, to help prevent further corrosion or rust from damaging the pipe.

Embodiments disclosed herein include:

A. A laser cleaning system for laser treating a pipe surface that includes a frame extendable about an outer circumference of a cylindrical pipe, a plurality of circumferential guide supports mounted to the frame and engageable with the outer circumference of the pipe, and a laser mounted to the frame to generate a laser beam directed toward an exterior surface of the pipe, wherein the frame is movable about the outer circumference of the pipe on the plurality of circumferential guide supports to scan the laser beam circumferentially across the exterior surface.

B. A method of laser treating a pipe surface that includes mounting a laser cleaning system to an outer circumference of a cylindrical pipe, the laser cleaning system including a frame, a plurality of circumferential guide supports mounted to the frame, and a laser mounted to the frame, generating a laser beam with the laser, moving the laser about the outer circumference of the pipe on the plurality of circumferential guide supports to scan the laser beam circumferentially across an exterior surface of the pipe, and ablating a substance from the exterior surface of the pipe with the laser beam.

C. A laser cleaning system for laser treating a pipe surface that includes a frame extendable about an outer circumference of a cylindrical pipe, at least one rail operatively coupled to the frame, a laser movably mounted to the at least one rail and configured to generate a laser beam, wherein the laser is movable on the at least one rail in an axial direction relative to the pipe to scan the laser beam axially across an exterior surface of the pipe, a plurality of circumferential guide supports mounted to the frame and engageable with the outer circumference of the pipe, wherein one or more of the plurality of circumferential guide supports comprise a rotatable structure that helps facilitate rotational movement of the laser about the outer circumference of the pipe, and a motor operatively coupled to at least one of the laser and the one or more of the plurality of circumferential guide supports to move the laser axially and circumferentially relative to the exterior surface.

Each of embodiments A, B, and C may have one or more of the following additional elements in any combination: Element 1: wherein the frame is circular and extends more than 180° but less than 360° about the outer circumference of the pipe. Element 2: wherein one or more of the plurality of circumferential guide supports comprise a rotatable structure that helps facilitate rotational movement of the laser about the outer circumference of the pipe. Element 3: further comprising a motor operatively coupled to the one or more of the plurality of circumferential guide supports to drive the one or more of the plurality of circumferential guide supports in rotation. Element 4: further comprising a control module in communication with at least one of the motor and the laser and operable to control operation of the at least one of the motor and the laser. Element 5: further comprising at least one rail operatively coupled to the frame, wherein the laser is movably mounted to the at least one rail and movable in an axial direction relative to the pipe to scan the laser beam axially across the exterior surface. Element 6: further comprising a plurality of radially extending struts interposing the frame and the at least one rail to support the laser. Element 7: further comprising a motor operatively coupled to the laser and operable to move the laser in the axial direction relative to the pipe. Element 8: further comprising a control module in communication with at least one of the motor and the laser and operable to control operation of the at least one of the motor and the laser. Element 9: wherein the laser comprises of a pulsed laser or a continuous wave laser.

Element 10: wherein one or more of the plurality of circumferential guide supports comprise a rotatable structure, the method further comprising rotating the laser about the outer circumference of the pipe on the one or more of the plurality of circumferential guide supports. Element 11: further comprising driving the one or more of the plurality of circumferential guide supports in rotation with a motor. Element 12: wherein the laser cleaning system further includes a control module in communication with at least one of the motor and the laser, the method further comprising controlling operation of the at least one of the motor and the laser with the control module. Element 13: wherein the laser cleaning system further includes at least one rail operatively coupled to the frame and the laser is movably coupled to the at least one rail, the method further comprising moving the laser in an axial direction relative to the pipe to scan the laser beam axially across the exterior surface of the pipe. Element 14: wherein the laser cleaning system further includes a motor operatively coupled to the laser, the method further comprising moving the laser in the axial direction on the at least one rail and relative to the pipe with the motor. Element 15: wherein the laser cleaning system further includes a control module in communication with at least one of the motor and the laser, the method further comprising controlling operation of the at least one of the motor and the laser with the control module. Element 16: further comprising mounting the laser cleaning system to the cylindrical pipe at a field joint, cleaning the field joint with the laser beam, moving the laser cleaning system away from the field joint, and coating the field joint with a protective coating.

Element 17: further comprising a control module in communication with at least one of the motor and the laser and operable to control operation of one or both of the motor and the laser.

By way of non-limiting example, exemplary combinations applicable to A, B, and C include: Element 2 with Element 3; Element 3 with Element 4; Element 5 with Element 6; Element 5 with Element 7; Element 7 with Element 8; Element 10 with Element 11; Element 11 with Element 12; Element 13 with Element 14; and Element 14 with Element 15.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:
1. A laser cleaning system for laser treating a pipe surface, comprising:
    a frame extendable about an outer circumference of a cylindrical pipe;

a plurality of circumferential guide supports mounted to the frame and engageable with the outer circumference of the pipe; and a laser mounted to the frame to generate a laser beam directed toward an exterior surface of the pipe; and a control module operable to cause the frame to move about the outer circumference of the pipe on the plurality of circumferential guide supports and simultaneously scan the laser beam circumferentially and axially across the exterior surface.

2. The laser cleaning system of claim 1, wherein the frame is circular and extends more than 180° but less than 360° about the outer circumference of the pipe.

3. The laser cleaning system of claim 1, wherein one or more of the plurality of circumferential guide supports comprise a rotatable structure that helps facilitate rotational movement of the laser about the outer circumference of the pipe.

4. The laser cleaning system of claim 3, further comprising a motor operatively coupled to the one or more of the plurality of circumferential guide supports, wherein the control module operates the motor to drive the one or more of the plurality of circumferential guide supports in rotation to move the frame about the outer circumference of the pipe.

5. The laser cleaning system of claim 1, further comprising at least one rail operatively coupled to the frame, wherein the laser is movably mounted to the at least one rail and movable in an axial direction relative to the pipe to scan the laser beam axially across the exterior surface.

6. The laser cleaning system of claim 5, further comprising a plurality of radially extending struts interposing the frame and the at least one rail to support the laser.

7. The laser cleaning system of claim 5, further comprising a motor operatively coupled to the laser, wherein the control module operates the motor to move the laser in the axial direction relative to the pipe.

8. The laser cleaning system of claim 1, wherein the laser comprises a pulsed laser or a continuous wave laser.

9. A method of laser treating a pipe surface, comprising:
mounting a laser cleaning system to an outer circumference of a cylindrical pipe, the laser cleaning system including:
a frame extending about the outer circumference;
a plurality of circumferential guide supports mounted to the frame and engageable with the outer circumference of the pipe;
a laser mounted to the frame; and
a control module operable to control operation of the plurality of circumferential guide supports and the laser;
generating a laser beam with the laser as directed by the control module;
moving the frame and the laser about the outer circumference of the pipe on the plurality of circumferential guide supports as directed by the control module and simultaneously scanning the laser beam circumferentially and axially across an exterior surface of the pipe; and
ablating a substance from the exterior surface of the pipe with the laser beam.

10. The method of claim 9, wherein one or more of the plurality of circumferential guide supports comprise a rotatable structure, the method further comprising rotating the laser about the outer circumference of the pipe on the one or more of the plurality of circumferential guide supports.

11. The method of claim 10, further comprising driving the one or more of the plurality of circumferential guide supports in rotation with a motor.

12. The method of claim 9, wherein the laser cleaning system further includes at least one rail operatively coupled to the frame and the laser is movably coupled to the at least one rail, the method further comprising moving the laser in an axial direction relative to the pipe to scan the laser beam axially across the exterior surface of the pipe.

13. The method of claim 12, wherein the laser cleaning system further includes a motor operatively coupled to the laser, the method further comprising operating the motor with the control module and thereby moving the laser in the axial direction on the at least one rail and relative to the pipe.

14. The method of claim 9, further comprising:
mounting the laser cleaning system to the cylindrical pipe at a field joint;
cleaning the field joint with the laser beam;
moving the laser cleaning system away from the field joint; and
coating the field joint with a protective coating.

15. A laser cleaning system for laser treating a pipe surface, comprising:
a frame extendable about an outer circumference of a cylindrical pipe;
at least one rail operatively coupled to the frame;
a laser movably mounted to the at least one rail and configured to generate a laser beam, wherein the laser is movable on the at least one rail in an axial direction relative to the pipe to scan the laser beam axially across an exterior surface of the pipe;
a plurality of circumferential guide supports mounted to the frame and engageable with the outer circumference of the pipe to facilitate movement of the frame and the laser about the outer circumference;
one or more motors operatively coupled to the laser and the one or more of the plurality of circumferential guide supports; and
a control module in communication with the one or more motors and operable to cause the one or more motors to move the frame and the laser axially and circumferentially relative to the exterior surface while simultaneously operating the laser.

16. The laser cleaning system of claim 1, further comprising a sensor in communication with the control module and operable to identify a location on the exterior surface of the pipe requiring cleaning, wherein the control module causes the frame to move to the location based on signals received from the sensor.

17. The method of claim 9, further comprising:
identifying a location on the exterior surface of the pipe requiring cleaning with a sensor in communication with the control module; and
moving the frame to the location based on signals received from the sensor, as directed by the control module.

18. The laser cleaning system of claim 15, further comprising a sensor in communication with the control module and operable to identify a location on the exterior surface of the pipe requiring cleaning, wherein the control module causes the frame to move to the location based on signals received from the sensor.

\* \* \* \* \*